US009671243B2

(12) United States Patent
Stein

(10) Patent No.: US 9,671,243 B2
(45) Date of Patent: Jun. 6, 2017

(54) VISION AUGMENTED NAVIGATION

(71) Applicant: Gideon Stein, Jerusalem (IL)

(72) Inventor: Gideon Stein, Jerusalem (IL)

(73) Assignee: MOBILEYE VISION TECHNOLOGIES LTD., Jerusalem (IL)

(*) Notice: Subject to any disclaimer, the term of this patent is extended or adjusted under 35 U.S.C. 154(b) by 0 days.

(21) Appl. No.: 14/303,830

(22) Filed: Jun. 13, 2014

(65) Prior Publication Data
US 2014/0372020 A1 Dec. 18, 2014

Related U.S. Application Data

(60) Provisional application No. 61/834,488, filed on Jun. 13, 2013.

(51) Int. Cl.
G01C 21/36 (2006.01)

(52) U.S. Cl.
CPC ..... *G01C 21/3602* (2013.01); *G01C 21/3644* (2013.01)

(58) Field of Classification Search
USPC ........................................ 701/438
See application file for complete search history.

(56) References Cited

U.S. PATENT DOCUMENTS

| 7,783,422 | B2 | 8/2010 | Tanaka | |
| 7,826,967 | B2* | 11/2010 | Jung | 701/439 |
| 8,060,302 | B2* | 11/2011 | Epshtein | G01C 21/3602 |
| | | | | 701/438 |
| 8,195,386 | B2* | 6/2012 | Hu et al. | 701/436 |

(Continued)

FOREIGN PATENT DOCUMENTS

| CN | 101046390 A | 10/2007 |
| CN | 103148861 A | 6/2013 |

(Continued)

OTHER PUBLICATIONS

International Search Report and Written Opinion in International Application No. PCT/US14/42261, dated Oct. 22, 2014 (11 pages).

(Continued)

*Primary Examiner* — Shelley Chen
(74) *Attorney, Agent, or Firm* — Finnegan, Henderson, Farabow, Garrett & Dunner, LLP

(57) ABSTRACT

A navigation system may include at least one processing device configured to determine, based on an output of one or more position sensors associated with the navigation system, a current location of at least one component associated with the navigation system and determine a destination location different from the current location. The navigation system may also acquire, from one or more image acquisition devices, a plurality of images representative of an environment of a user of the navigation system and derive, from the plurality of images, visual information associated with at least one object in the environment. The system may also determine one or more instructions for navigating from the current location to the destination location, wherein the one or more instructions include at least one reference to the visual information derived from the plurality of images. The system may also deliver to the user the one or more instructions.

42 Claims, 5 Drawing Sheets

(56) References Cited

U.S. PATENT DOCUMENTS

| | | | |
|---|---|---|---|
| 8,688,377 B1* | 4/2014 | Urbach et al. | 701/522 |
| 8,886,454 B2 | 11/2014 | Cho | |
| 2007/0088497 A1* | 4/2007 | Jung | 701/207 |
| 2007/0233380 A1* | 10/2007 | Tanaka | G01C 21/3602 701/436 |
| 2008/0195315 A1* | 8/2008 | Hu et al. | 701/212 |
| 2008/0312824 A1* | 12/2008 | Jung | 701/208 |
| 2009/0125234 A1* | 5/2009 | Geelen et al. | 701/209 |
| 2010/0250116 A1* | 9/2010 | Yamaguchi et al. | 701/201 |
| 2011/0199479 A1* | 8/2011 | Waldman | 348/116 |
| 2012/0191346 A1* | 7/2012 | Geelen et al. | 701/526 |
| 2012/0218125 A1 | 8/2012 | Demirdjian et al. | |
| 2013/0127980 A1 | 5/2013 | Haddick et al. | |
| 2013/0197801 A1* | 8/2013 | Geelen et al. | 701/461 |

FOREIGN PATENT DOCUMENTS

| | | |
|---|---|---|
| DE | 10245335 A1 | 4/2004 |
| EP | 1378724 A1 | 1/2004 |
| EP | 2289057 | 3/2011 |
| EP | 2598842 | 6/2013 |
| WO | WO 2008/132130 A1 | 11/2008 |

OTHER PUBLICATIONS

Extended European Search Report issued in corresponding European Application No. 14811681.7, dated Jan. 23, 2017 (9 pages).
First Office Action dated Feb. 21, 2017 from Chinese Patent Office, which was received in Chinese Patent Application No. 201480044985.6 (12 pages).

* cited by examiner

VISION AUGMENTED NAVIGATION

CROSS REFERENCE TO RELATED APPLICATION

This application claims priority under 35 U.S.C. §119 to U.S. Provisional Application No. 61/834,488, filed Jun. 13, 2013, which is incorporated herein by reference in its entirety.

TECHNICAL FIELD

The present disclosure relates generally to a navigation system and, more specifically, to devices and techniques for augmenting navigational instructions with visual information determined based on image information acquired from one or more image acquisition devices.

BACKGROUND

GPS-based navigation systems, including those employed in vehicular applications, are useful and common. The user interface to these types of navigation systems continues to improve and can now accept information from social networks and realtime information from traffic control systems. However, other improvements may further enhance the functionality of these systems and make them even more user-friendly. For example, in current systems, audible navigation instructions are provided based on information derived from map data, but these instructions do not take into account what the user of the navigational system can actually see. These kinds of systems are therefore capable of providing limited information to the user.

Including other kinds of information, such as visual information acquired by an imaging system, may make navigation systems more user friendly. In addition, adding visual information to instructions provided by the navigation system may allow these systems to function in a manner more natural to a user. For example, the visual information derived from an imaging system may be translated into context aware information delivered to the user in a manner similar to having a passenger in a vehicle supplying directions to a driver of the vehicle. For example, instead of simple instructions such as "turn left in 100 m" or "turn left at the next intersection" a passenger might say "turn left where the red car turned" or "turn left past that yellow awning."

SUMMARY

Disclosed herein are embodiments, including systems and methods, for augmenting, supplementing, substituting, or otherwise modifying standard navigational instructions to include visual cues associated with visual information derived from image data relating to an environment associated with a vehicle, user, etc.

Consistent with disclosed embodiments, a navigation system may include at least one processing device configured to determine, based on an output of one or more position sensors associated with the navigation system, a current location of at least one component associated with the navigation system and determine a destination location different from the current location. The navigation system may also acquire, from one or more image acquisition devices, a plurality of images representative of an environment of a user of the navigation system and derive, from the plurality of images, visual information associated with at least one object in the environment. The system may also determine one or more instructions for navigating from the current location to the destination location, wherein the one or more instructions include at least one reference to the visual information derived from the plurality of images. The system can also deliver to the user the one or more instructions.

Consistent with disclosed embodiments, a vehicle may include a GPS sensor configured to provide an output representative of a position of the vehicle. The vehicle may also include one or more image acquisition devices configured to acquire a plurality of images of an environment outside of the vehicle. The vehicle may include a navigation system may include at least one processing device configured to determine, based on an output of one or more position sensors associated with the navigation system, a current location of at least one component associated with the navigation system and determine a destination location different from the current location. The navigation system may also acquire, from one or more image acquisition devices, a plurality of images representative of an environment of a user of the navigation system and derive, from the plurality of images, visual information associated with at least one object in the environment. The system may also determine one or more instructions for navigating from the current location to the destination location, wherein the one or more instructions include at least one reference to the visual information derived from the plurality of images. The system can also deliver to the user the one or ore instructions.

Consistent with disclosed embodiments, a method for generating and delivering navigational information, may include using one or more processing devices to determine a current location based on an output of one or more position sensors; determining a destination location different from the current location; acquiring, from one or more image acquisition devices, a plurality of images representative of an environment surrounding an individual; using the one or more processing devices to derive, from the plurality of images, visual information associated with at least one object in the environment; determining one or more instructions for navigating from the current location to the destination location, wherein the one or more instructions include at least one reference to the visual information derived from the plurality of images; and delivering to the individual the one or more instructions.

It is to be understood that both the foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIGS. 4A and 4B provide diagrammatic representations of an exemplary mobile device including a navigation system consistent with the disclosed embodiments.

DETAILED DESCRIPTION

Figure 1:
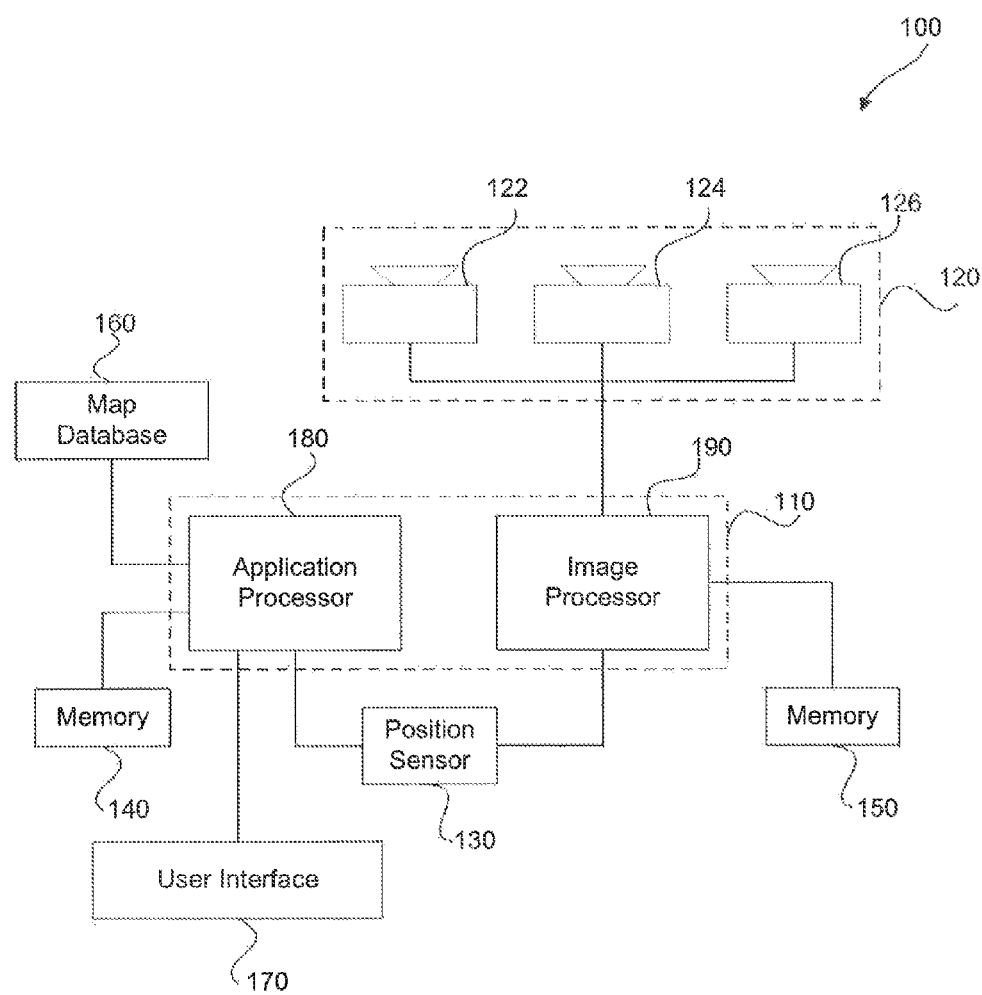
FIG. 1 is a diagrammatic representation of an exemplary navigation system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limiting of the disclosed embodiments. Instead, the proper scope is defined by the appended claims.

FIG. 1 provides a block diagram representation of a navigation system 100 consistent with the exemplary disclosed embodiments. Navigation system 100 may include various components depending on the requirements of a particular implementation. In some embodiments, navigation system 100 may include a processing unit 110, an image acquisition unit 120, a position sensor 130, one or more memory units 140, 150, a map data database 160, and a user interface 170. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more cameras, such as a camera 122, a camera 124, and a camera 126.

Both applications processor 180 and image processor 190 may include various types of processing devices. For example, either or both of applications processor 180 and image processor 190 may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc. and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32 bit RISC CPUs (MIPS32® 34K® cores), five Vision Computing Engines (VCE), three Vector Microcode Processors (VMP®), Denali 64 bit Mobile DDR Controller, 128 bit internal Sonics Interconnect, dual 16 bit Video input and 18 bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices.

Each memory 140, 150 may include software instructions that when executed by a processor (e.g., applications processor 180 and/or image processor 190), may control operation of various aspects of navigation system 100. These memory units may include various databases and image processing software. The memory units may include random access memory, read only memory, flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of navigation system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

User interface 170 may include any device suitable for providing information to or for receiving inputs from one or more users of navigation system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to navigation system 100 by typing instructions or information, providing voice commands, selecting menu options on a screen using buttons, pointers, or eye-tracking capabilities, or through any other suitable techniques for communicating information to navigation system 100.

User interface 170 may be equipped with one or more processing devices configured to provide and receive information to or from a user and process that information for use by applications processor 180, for example. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to navigation system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of navigation system 100. Alternatively or additionally, map database 160 or a portion thereof may be located remotely with respect to other components of navigation system 100 (e.g., processing unit 110). In such embodiments, information from map database 160 may be downloaded over a wired or wireless data connection to a network (e.g., over a cellular network and/or the Internet, etc.).

Cameras 122, 124, and 126 may each include any type of device suitable for capturing at least one image from an environment. Moreover, any number of cameras may be used to acquire images for input to the image processor. Some embodiments may include only a single camera, while other embodiments may include two cameras, three cameras, or even four or more cameras.

Figure 2:
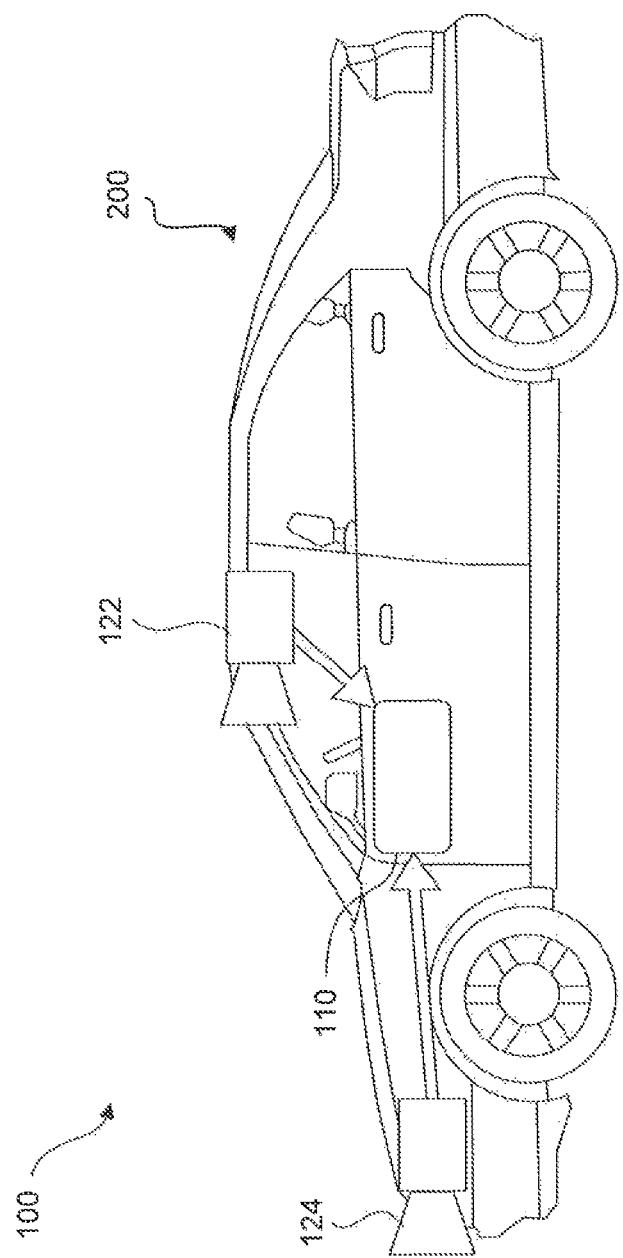
FIG. 2 is a diagrammatic representation of an exemplary vehicle including a navigation system consistent with the disclosed embodiments.

Navigation system 100, or various components thereof, may be incorporated into various different platforms. In some embodiments, navigation system 100 may be included on a vehicle 200, as shown in FIG. 2. For example, vehicle 200 may be equipped with a processing unit 110 and any of the other components of navigation system 100, as described above relative to FIG. 1. While in some embodiments vehicle 200 may be equipped with only a single camera, in other embodiments, multiple cameras may be used. For example, either of cameras 122, 124 of vehicle 200, as shown in FIG. 2, may be part of an ADAS (Advanced Driver Assistance Systems) camera set.

The cameras included on vehicle 200 as part of the image acquisition unit 120 may be positioned at any suitable location. In some embodiments, as shown in FIG. 2 and in FIG. 3, camera 122 may be located in the vicinity of the rear view mirror. This position may provide a line of sight similar to that of the driver of vehicle 200, which may aid in determining what is and is not visible to the driver. Camera 122 may be positioned at any location near to the rear view mirror, but placing camera 122 on the driver side of the mirror may further aid in obtaining images representative of the driver's field of view and/or line of sight.

Other locations for the cameras of image acquisition unit 120 may also be used. For example, camera 124 may be located on or in a bumper of vehicle 200. Such a location may be especially suitable for cameras having a wide field of view. The line of sight of bumper-located cameras can be different from that of the driver and, therefore, the bumper camera and driver may not always see the same objects.

In addition to cameras, vehicle 200 may include various other components of navigation system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

Figure 3:
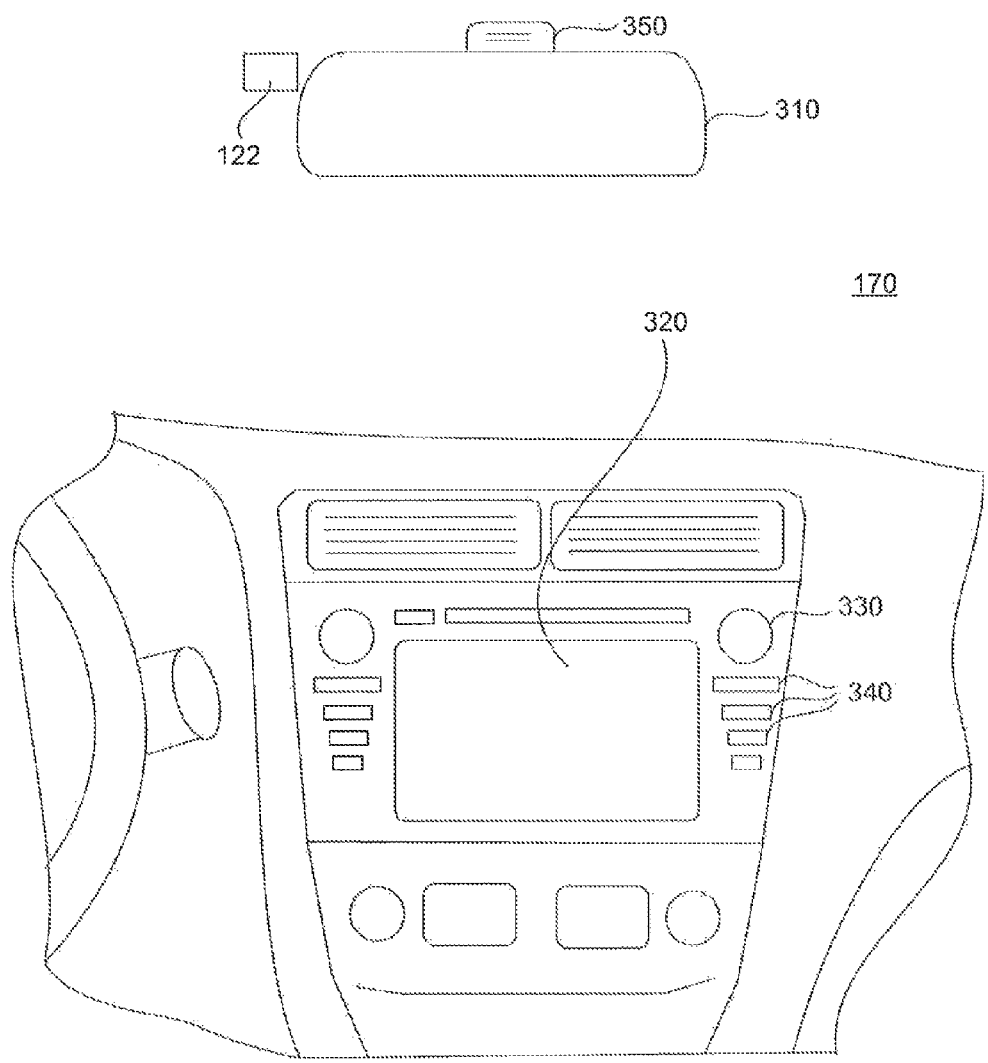
FIG. 3 is a diagrammatic representation of an interior of a vehicle including a navigation system consistent with the disclosed embodiments.

Vehicle 200 may also include a user interface 170 for interacting with a driver or passenger of vehicle 200. For example, as shown in FIG. 3, user interface 170 in a vehicle application may include a touch screen 320, knobs 330, buttons 340, and a microphone 350. In some embodiments, microphone 350 may be positioned adjacent to rearview mirror 310, similar to camera 122. In vehicle applications, user interface 170 may also include one or more speakers (e.g., speakers of a vehicle audio system).

Figure 4A:
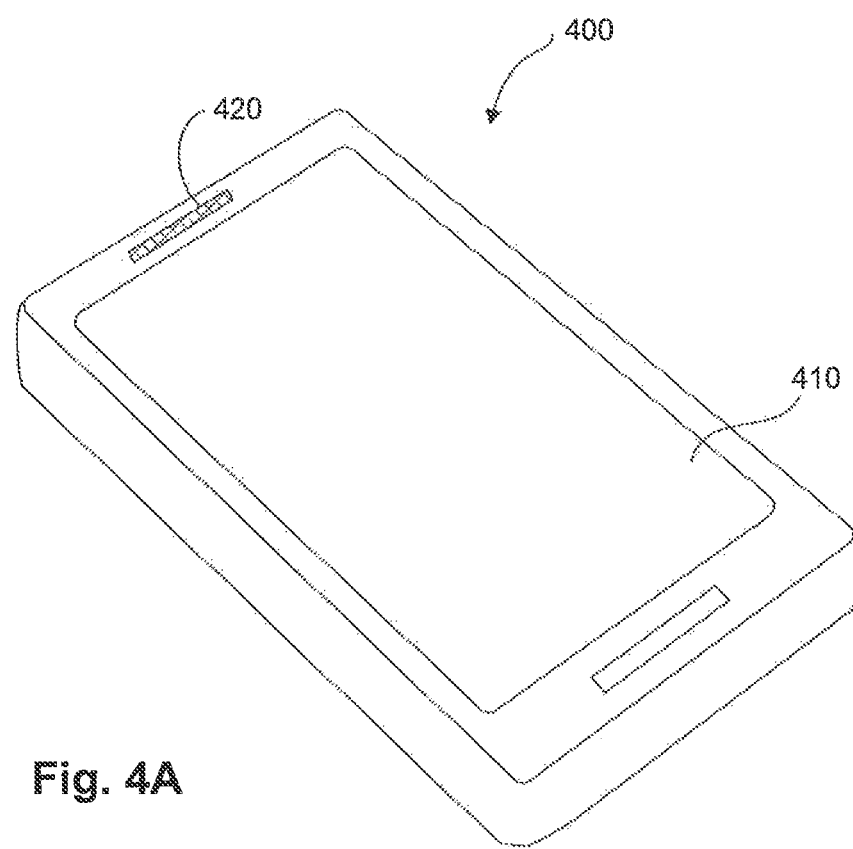
Figure 4A:
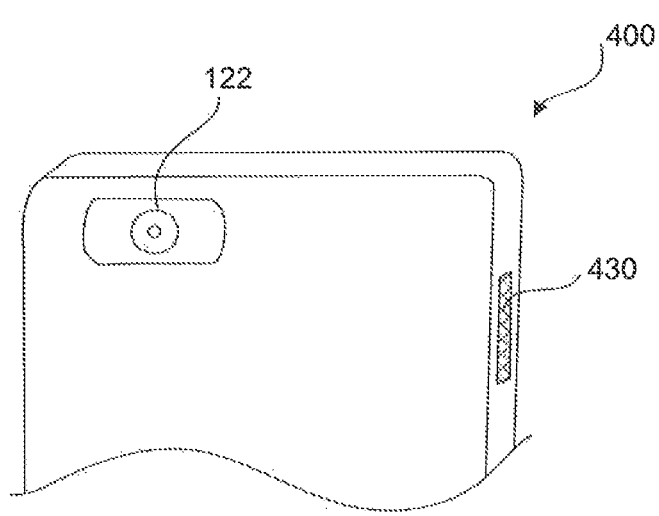

One or more components of navigation system 100 may also be included on other platforms. For example, as shown in FIGS. 4A and 4B, components of navigation system 100 may also be included on a mobile device 400, which may include a smartphone, tablet, etc. In such embodiments, applications processor 180 may correspond to the applications processor of the mobile device, and image processor 190 may be integrated together with or provided separate from the applications processor of the mobile device. Similar to the vehicular application, mobile device 400 may include memory units 140, 150, a position sensor 130 (e.g., a GPS unit), and a map database 160, which may be included on mobile device 400 or which may be accessible via a wireless data connection.

Mobile device 400 may also include one or more components of a user interface 170. For example, in some embodiments, mobile device 400 may include a touchscreen 410, a speaker 430, and/or a microphone 420. Mobile device 400 may also include one or more cameras, such as camera 122, as shown in FIG. 4B. In addition to cameras located on mobile device 400, an image acquisition unit 120 associated with mobile device 400 may also include cameras located apart from mobile device 400. For example, in some embodiments, mobile device 400 may be configured to receive image data from one or more cameras associated another device or platform (e.g., cameras included on vehicle 200 or on any other platform with which mobile device 400 may communicate). In such embodiments, mobile device 400 may receive image data from remotely located cameras via a wired or wireless data connection. For example, in some embodiments, mobile device 400 may be attached to vehicle 200 (e.g., via a removable mount positioned on the dashboard, windshield, etc.). Mobile device 400 may communicate with components included on vehicle 400. In some embodiments, mobile device 400 may communicate with one or more processing devices on vehicle 400 to receive image information, navigation instructions, etc. (via a Bluetooth connection or other wireless or wired connection). Mobile device 400 may then pass the information along to the user in the form of unmodified navigation instructions, or it may develop new or augmented navigation instructions developed based on information either received from vehicle 200 or based on readings from its own onboard systems (e.g., a GPS receiver etc.). In this way, mobile device 400 may augment information provided by a vehicle-based user interface 170, as shown in FIG. 3, or may serve as a vehicle-based user interface or as a substitute for a vehicle-based interface.

Figure 5A:
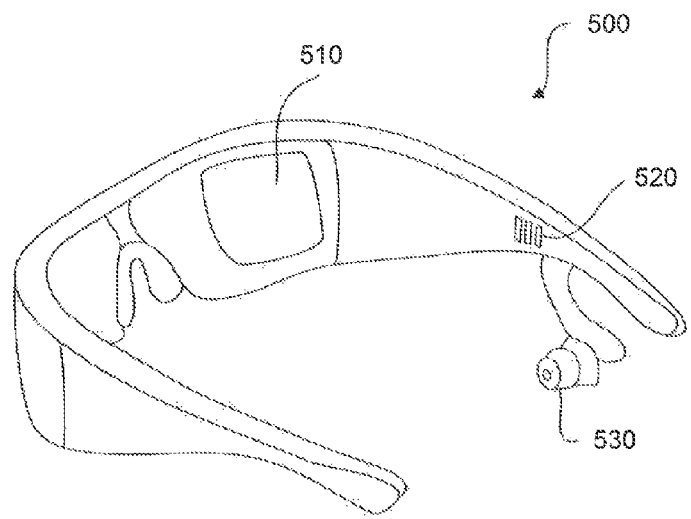
FIGS. 5A and 5B provide diagrammatic representations of an exemplary wearable device including a navigation system consistent with the disclosed embodiments.
Figure 5B:
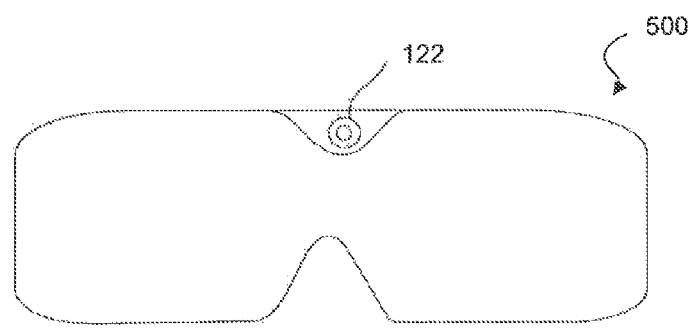

As shown in FIGS. 5A and 5B, components of navigation system 100 may also be included on a wearable device 500, which may include a wrist unit, a glasses unit, a head-mounted unit, etc. In such embodiments, applications processor 180 may correspond to the applications processor of the wearable device, and image processor 190 may be integrated together with or provided separate from the applications processor of the wearable device. Similar to the vehicular application and mobile device platform, wearable device 500 may include memory units 140, 150, position sensor 130 (e.g., a GPS unit), and map database 160, which may be included on wearable device 500 or which may be accessible via a wireless data connection.

Wearable device 500 may also include one or more components of a user interface 170. For example, in some embodiments, wearable device 500 may include a display 510, a speaker 530, and/or a microphone 520. Wearable device 500 may also include one or more cameras, such as camera 122, as shown in FIG. 5B. In addition to cameras located on wearable device 500, an image acquisition unit 120 associated with wearable device 500 may also include cameras located apart from wearable device 500. For example, in some embodiments, wearable device 500 may be configured to receive image data from one or more cameras associated another device or platform (e.g., cameras included on vehicle 200 or on any other platform with which wearable device 500 may communicate). In such embodiments, wearable device 500 may receive image data from remotely located cameras via a wired or wireless data connection.

Returning to cameras 122, 124, and 126, in embodiments where more than one camera is used (regardless of whether those cameras are included on a vehicle 200, a mobile device 400, a wearable device 500, or any other platform), those cameras may have similar characteristics, including, for example, similar focal lengths, fields of view, image sensors, etc. On the other hand, one or more of any plurality of cameras may be configured differently from any of the other cameras. For example, in some embodiments, a first camera (e.g., camera 122) may be configured with a focal length different from a focal length of a second camera (e.g., camera 124). Where navigation system 100 includes or interacts with an image acquisition system 120 having a third camera (e.g., camera 126), that third camera may have a focal length different from the focal length of the first camera and the focal length of the second camera.

Any of cameras 122, 124, or 126 may also be configured with a resolution suitable for a particular application. Because navigation system 100 may augment navigation instructions with visual cue information for a user derived from images obtained from cameras 122, 124, or 126, one or more of those cameras may be configured to exhibit characteristics similar to the human eye. For example, in some embodiments, one or more of the cameras may be sensitive to color (e.g., an RGB camera sensitive to red, green, and blue similar to the cones found in human eyes). Further, one or more of the cameras may have a pixel resolution/field of view combination providing a visual acuity similar to the human eye. For example, in some embodiments, a camera may have a resolution of at least 5 Megapixels and a horizontal field of view of about 50 degrees (similar to cameras currently included on some smartphone devices). In other embodiments, a camera in navigation system 100 may have an SXGA resolution of about 1.3 Megapixels and a horizontal field of view of less than 30 degrees (e.g., about 23 degrees). A camera in navigation system 100 may exhibit a resolution and a horizontal field of view that provides a ratio of at least 40 horizontal pixels (i.e., pixels in a row extending along the X dimension of the image sensor) per degree. In some embodiments, the ratio may be more than 45 horizontal pixels per degree, 50 horizontal pixels per degree, or more than 55 horizontal pixels per degree.

Cameras 122, 124, and/or 126 may include various optical elements. In some embodiments, one or more lenses may be included, for example, to provide a desired focal length and field of view for the cameras. In some embodiments, cameras 122, 124, and/or 126 may be associated with a 6 mm lens or a 12 mm lens. In some embodiments, cameras 122, 124, and/or 126 may be configured to capture images having a field of view (FOV) of about 46 degrees, 50 degrees, 52 degrees, or greater. For example, cameras 122, 124, and/or 126 may also be configured with narrower fields of view for example, in some embodiments, cameras 122, 124, and/or 126 may have an FOV of 40 degrees, 30 degrees, 26 degrees, 23 degrees, 20 degrees, or less. In some embodiments, any of cameras 122, 124, or 126 may include a wide angle FOV of up to about 180 degrees (e.g., between about 100 degrees and about 150 degrees).

Cameras 122, 124, and/or 126 may contain any suitable type of image sensor, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame. In other embodiments, a global shutter may be used.

Cameras 122, 124, and/or 126 may be located relative to a platform device (e.g., vehicle 200, mobile device 400, wearable device 500, etc.) such that images from an environment visible to (i.e., within an expected sight range) a user may be obtained. For example, in a vehicular application, as shown in FIGS. 2 and 3, a camera 122 may be placed in the vicinity of a rearview mirror 310. In some embodiments, camera 122 may be positioned at a known height from the ground (e.g., approximately 1.4 m above the ground), and this information may be used to determine relative scales in images captured by camera 122.

The frame rate of cameras 122, 124, and/or 126 (e.g., the rate at which a camera acquires a set of pixel data of one image frame before moving on to capture pixel data associated with the next image frame) may be controllable. The frame rate may be used, for example, in determining distances to objects captured in images acquired by cameras 122, 124, and/or 126. The frame rate of any of cameras 122, 124, and/or 126 may be higher, lower, or the same as the frame rate associated with any other camera.

Further, the focal length associated with each of cameras 122, 124, and/or 126 may be selectable (e.g., by inclusion of appropriate lenses etc.) such that each camera acquires images of objects at a desired distance range relative to a platform system (e.g., vehicle 200, mobile device 400, wearable device 500, etc.). For example, in some embodiments cameras 122, 124, and/or 126 may acquire images of close-up objects within a few meters. Cameras 122, 124, and/or 126 may also be configured to acquire images of more distant objects (e.g., at a range of 25 m, 50 m, 100 m, 150 m, or more). Further, the focal lengths of cameras 122, 124, and/or 126 may be selected such that one camera (e.g., camera 124) can acquire images of relatively close objects (e.g., within 10 m or within 20 m) while another camera (e.g., camera 126) can acquire images of more distant objects (e.g., at a range greater than 20 m, 50 m, 100 m, 150 m, etc.). The field of view associated with each of cameras 122, 124, and/or 126 may depend on the respective focal length. For example, as the focal length increases, the corresponding field of view decreases.

In operation, navigation system 100 may provide navigational instructions to a user. The navigational instructions may include information relating to or derived from map data (e.g., data stored in map database 160), and may further include information relating to or derived from image data acquired by image acquisition unit 120.

To develop navigational instructions, processing unit 110 may determine a current location of at least one component associated with navigation system 100. For example, in some embodiments, applications processor 180 may access position sensor 130 and retrieve an output indicative of a position. This position may correspond to a position of vehicle 200, mobile device 400, wearable device 500, etc.

Processing unit may also be configured to determine a destination location different from the current location. The destination location may correspond to a location to which a user desires to go, a location a third party designates for the user, or any other location different from the current location. The destination location may be provided to processing unit 110 by any suitable method. In one embodiment, a user may enter the destination location via user interface 170. For example, an address, latitude and longitude coordinates, etc. may be introduced to processing unit 110 by typing on a keyboard or touchscreen; speaking one or more voice commands; selecting menu items using a pointer device or tracked eye movements; or by any other suitable data entry technique.

With the current location and the desired destination location information, traditional navigation systems may access map data, determine a route, and generate instructions for navigating along that route. The presently described embodiments, however, include instructions that feature additional information determined based on images provided by image acquisition unit 120.

For example, in some embodiments, processing unit 110 may be configured to acquire from one or more image acquisition devices (e.g., cameras 122, 124, and/or 126) a plurality of images representative of an environment of a user of navigation system 100. Based on this plurality of images, processing unit 110 may derive visual information associated with at least one object in the environment. For example, applications processor 180 and/or image processor 190 may analyze one or more objects appearing in the plurality of images provided by image acquisition unit 120 and derive visual information from the images that relates to at least one characteristic of an object in the environment. In some embodiments, the object may include any of at least one of a vehicle, a building, a sign, a traffic light, a road feature, a structure, or a person. Visual information that may be derived from the images may include nearly any visual aspect of a viewed object, including, for example, a color, size, or building material of a building; a color of an awning; the name of a recognized logo (e.g., a McDonald's sign, golden arches, etc.); recognized text from a building, road sign, or painted lettering on a road surface; a color of another vehicle; a road feature, such as a fork, bump, dip, speed bump, etc. associated with a road; a color of clothing worn by a pedestrian; a color of a fence; etc. The visual information may also include a recognized type designation for the object. For example, the visual information may include a recognized type of a fence (e.g., wood, chain link, picket, stockade, etc.), a recognized type or brand of vehicle (e.g., a truck, car, tractor, Maserati, Audi, etc.); a type of bridge; type of building; etc.

Any type of visual information may be used depending on the requirements of a particular task. In some embodiments, processing unit 110 may be equipped to recognize and provide visual cues to a user based on objects in an urban setting (e.g., pedestrians, traffic lights, buildings, cars, businesses, etc.). Processing unit 110 may also be configured to recognize and provide visual cues to a user based on objects found in a rural setting (e.g., hedges, trees, fences, farm buildings, country walls, animals, etc.).

In some embodiments, other vehicles may serve as the basis for the derived visual information and visual cues provided to a user. Information about such vehicles may be determined as a by-product of ADAS applications or may supplement the information provided by ADAS applications. For example, a forward collision warning system may detect all of the vehicles present in the field of view of a camera and may compute the distance to the target vehicles. A list of these target vehicles and the distances may be conveyed to navigation system 100. If any of the target vehicles is located at a distance of interest (e.g., near to a turn along a calculated route to the destination location), then that target vehicle may be used as the basis for a visual cue provided to the user. For example, if a target vehicle at a distance of interest makes a turn along the calculated route, this information, along with one or more characteristics associated with the target vehicle (e.g., color, type, etc.) may be conveyed to the driver.

Colors of objects in the field of view of cameras 122, 124, and/or 126 may be determined in any suitable manner. For example, in some embodiments, any of cameras 122, 124, and/or 126 may constitute full-color cameras. Alternatively, where one or more of cameras 122, 124, and/or 126 is part of an ADAS system, which may employ cameras that are not full RGB cameras (e.g., cameras with only a red/clear sensor), such systems may be augmented with one or more additional cameras. Such augmentation may minimize mistakes in color identification, such as confusing blue with green. In operation, the target vehicle from an ADAS camera is matched with a patch provided by the color camera in order to determine or confirm color information associated with the target vehicle.

Distances to objects within the field of view of cameras 122, 124, and/or 126 may also be determined using any suitable method. In some embodiments, a depth map may be determined using structure from motion (SFM). Such depth maps may be available as computational output from ADAS systems, for example. SFM depth maps may be determined, for example, by comparing two images acquired by a camera from different locations (e.g., as the camera moves with a vehicle 200). The motion of the camera and the resulting appearance of a target object in two of the acquired images may enable determination of a distance to the target object, such as where at least one distance is known and can be used as the basis for a relative scale determination (e.g., a distance between the acquiring camera and a road surface). While any two images may be compared, in some embodiments, images acquired after motion over a distance of 10 m or more may provide a suitable basis for determining target distances in the 100 m range (which may be useful for determining navigational aids). Additional information, such as a speedometer reading or output from a GPS unit may also be used to determine distances to a target object. For example, the speedometer or GPS may provide information regarding the host vehicle motion, which may provide global scale information to the SFM results and thus distance to the target objects.

Such calculations can be performed for every pixel in a series of images to yield image depth maps. These depths maps may be used, for example, to determine whether a particular target object is located before or after an intersection of interest. The depth map may be a two-dimensional array of pixels with each pixel value indicating the depth to a point in the scene. As will be discussed further below, this information may be used to provide navigation instructions including visual information, such as "turn left in 100 m just before the shop with the yellow awning."

Depth map calculation may be computationally expensive. Therefore, where ADAS depth maps are already available, they may be readily used. In other embodiments, however, GPS cued vision may offer an alternative that may be less computationally expensive. For example, position sensor 130 may be used to determine a distance to an intersection. With this information, two images may be acquired at locations of a suitable distance apart to give good depth estimates for the target distance to the intersection (e.g., 1 m to 10 m apart for target distances of around 100 m; 1 m to 20 m apart for target distances of around 200 m; or between about 5% and 10% of the target distance of interest). At least one of the two images may then be warped and the warped image may be compared to the other image to determine whether any target objects match the target distance. That is, selected areas of the images may be analyzed (e.g., those corresponding to potential target objects) against expected changes in the images of targets located at the target distance, in view of the amount of motion between acquisition of the images. Those areas of the images that exhibit motion characteristics expected of objects located at the target distance of interest are deemed matches and may be used as the basis for visual information provided to a user of navigation system 100.

More specifically, the system may be configured to correlate a first area of a first image with a corresponding area of a second image and compute a dense optical flow between the first area of the first image and the corresponding area of the second image. The dense optical flow may be used to warp at least one of the first or second images. Navigation system 100 may process the acquired images in order to match object features in the first image against those in the second image in order to establish correspondences. The system may create a disparity map containing depth information for each pixel. The disparity map computation may represent the distance, typically in pixels, between the x-coordinates of corresponding points in the first image and the second image. For each pixel in the first and/or second image, the disparity map may contain the disparity and the depth information for the image point. The system may generate disparity images at different resolutions. Those with disparities that fall within a certain range of an expected value (e.g., ±10%) may constitute matches and, therefore, may correspond to objects located at the desired target distance. This technique, which may be referred to as GPS cued vision, may be more efficient than computing a dense depth map for an entire image.

To compute accurate motion, points along a road plane may be tracked. Based on the tracked points, a homography may be computed, which can be decomposed into rotation and FOE. To span a whole baseline (i.e., distance of travel between acquired images) of 10 m or even 20 m, it may be convenient to compute ego motion on intermediate baselines, such as frames 2 m to 3 m apart and to concatenate the motion. Otherwise the points on the road may move too much and, therefore, may be difficult to track.

Once the ego motion is known, the two images can be rectified rotated so as to eliminate the image rotation. This may result in a pure translation pair. In order to detect features at 200 m with a baseline of 10 m, one image may be scaled around the FOE by a factor of 210/200 and features that align are likely to be at that distance. To verify this distance, a third image can be used with a different baseline and the matching repeated with an appropriate scaling. Features than give good matches in both tests may be deemed as located at 200 m.

Multiple scalings can be used to sweep the range around 200 m. Alternatively, the residual flow after scaling for 200 m gives the residual depth. This process allows one to filter out features in a particular depth window around the relevant depth obtained from the GPS.

After identifying one or more target objects located at a distance of interest, based on the plurality of acquired images, visual information associated with any of those target objects may be used to determine one or more instructions for navigating from the current location to the destination location. Specifically, navigation system 100 may include in the one or ore instructions at least one reference to the visual information derived from the plurality of images.

Such instructions may be developed by applications processor 180, by image processor 190, by a combination of both, or using one or more other processing devices. For example, in some embodiments, image processor 190 may be configured to provide applications processor 180 with a list of target objects present in the acquired images along with their respective distances and one or more visual characteristics associated with the target objects. Applications processor 180 may determine instructions by identifying and selecting target objects from the list that are located at a target distance of interest and incorporating into one or more instructions visual information associated with the selected target object.

Alternatively, when applications processor 180 is ready to issue a new instruction, it may send a query to image processor 190 to identify a target object located at a particular target distance of interest. Image processor may respond by returning an identity of a target object along with one or more visual characteristics of the target object. Applications processor 180 may then incorporate this information into the developed instructions.

In other embodiments, image processor 190 may be responsible for developing navigational instructions that incorporate visual information. These instructions may be provided to applications processor 180 for delivery to the user or image processor 190 may deliver these instructions directly to the user.

In some embodiments, navigation system 100 may test for whether a particular object should be visible to a user before issuing instructions including visual information regarding the particular object. For example, based on map data information stored, e.g., in map database 160, the existence of a certain object (e.g., a particular business) and its exact location may be known. Such objects represented in stored map information may be referred to as mapped entities. In some embodiments, processing unit 110 could develop navigational instructions referencing the mapped entity (e.g., "turn left at the Exxon gas station in 100 m"). The use of visual information, however, can be used to enhance these types of instructions. For example, in some embodiments, a particular landmark or business may not be represented as a mapped entity stored in map database 160. In such cases, image acquisition unit 120 and image processor 190 may identify such objects as located at a distance of interest and may determine one or more visual characteristics to include in a navigational instruction (e.g., "turn left at the Exxon gas station in 100 m" based on character recognition and/or logo or color recognition of a sign or markings associated with the business; "turn right just after the building with the blue awning;" etc.).

Additionally, navigation system 100 may determine whether a particular mapped entity should be visible to the user and generate the navigational instructions based on this information. For example, if navigation system 100 is aware of a particular gas station stored as a mapped entity, but recognizes based on the output of image acquisition unit 120 that a driver is behind a large truck that blocks the driver's view of the gas station, navigation system 100 may avoid issuing a confusing instruction that references a gas station that the driver cannot see. Alternatively, navigation system 100 may proceed and issue the an instruction about the obscured object, but may do so along with information that it is currently obscured and visual information associated with the obscuring object (e.g. "turn left at the next Exxon station behind the white truck").

Or, in the case that navigation system 100 knows of a particular location (e.g., a McDonald's restaurant) stored as a mapped entity, navigation system 100 can use the output of image acquisition unit 120 to test whether the mapped entity is present and develop appropriate navigational instructions based on the test. For example, if the a yellow sign associated with the mapped entity McDonald's is recognized in the images provided by image acquisition unit 120, then navigation system 100 may issue an instruction that says "turn right just after the yellow McDonald's sign." On the other hand, if no yellow sign is found in the acquired images, navigation system 100 may simply say, "turn right just after the McDonald's" or "turn right in 100 m" if the McDonald's is not located in the images.

Thus, in some embodiments, processing unit 110 may be configured to use map data to identify at least one mapped entity and determine, based on the plurality of images provided by image acquisition unit 120, whether the at least one mapped entity is visible to the user. If the mapped entity is visible to the user, processing unit 110 may include in the determined one or more instructions at least one reference to the mapped entity (e.g., including at least one visual characteristic of the mapped entity). On the other hand, if the mapped entity is determined to not be visible to the user, then processing unit 110 may omit from the determined instructions a reference to the mapped entity or, alternatively, may include in the determined one or more instructions at least one reference to the mapped entity and at least one reference to an object obscuring the mapped entity from the user's view.

In some embodiments, more than one target object may be present at a relevant target distance. In such cases, navigation system 100 may employ a hierarchical scheme to determine which target objects should be used as the basis for the visual information to be included in the navigational instructions. For example, once a target distance is determined (e.g., a distance determined for a next turn along a route to the destination location), map database 160 may be accessed to determine whether any appropriate mapped entities may be present at the target distance. If the mapped entities are visually verified based on the images provided by image acquisition unit 110, then those mapped entities may be filtered according to a predetermined hierarchy. For example, mapped entities associated with large physical structures may be selected over mapped entities associated with smaller physical structures for use in developing the navigational instructions. Similarly, mapped entities associated with bright colored signs, markers, logos, etc. may be selected over those without such signs, markers, or logos.

In some cases, multiple mapped entities may be identified and/or verified as located at the target distance. In such cases, navigation system 100 may apply additional hierarchical rankings to determine which of the multiple targets on which to rely. Again, color and size of the objects may be factors in ranking the objects. Additionally or alternatively, location of the object may be used. For example, target objects located on a turn side and prior to an intersection may rank ahead of target objects located on the turn side, but after the intersection. Even lower on the hierarchy may be target objects located opposite the turn side and before the intersection, which may rank higher than target objects located opposite the turn side and after the intersection. The priority list can be adjusted according to user preferences.

Based on this hierarchy, navigation system 100 may output a turn instruction appropriate for the target object and what feature is visible: "Turn left in 200 m, past the Holiday Inn with the green awning."

Next, if no landmarks are detected or verified from the map database, the system may attempt to determine whether any vehicles qualify as target objects at the relevant target distance. For example, if a vehicle is recognized from the acquired images as turning at the relevant intersection, the vehicle may be used as the basis for the instruction. E.g., "follow the red car turning left at the intersection in 100 m."

Next, if no mapped entities or relevant vehicles are located, navigation system 100 may search for visually detected structures located at the target distance. If such a structure is located, processing unit 110 may attempt to classify the structure using color histograms, template matching, pattern recognition, and/or OCR against a database of landmark objects such as gas stations of particular brands, fast food restaurants with distinct logos etc. If a match is found, then appropriate instructions including visual information relative to the identified structure may be provided.

If the structure cannot be matched to a specific instance in the database than a class type may be identified and used. Some examples may include: (a) if a red brick color structure above 6 m high is detected, then denote "tall brick building;" (b) if a blob of color larger than 1 m in size is located at least 2 m from the ground, then denote "color awning;" (c) if in England and a red object approximately 1.5 m tall and 0.5 m wide is detected, then denote "mailbox." Of course, many other classes can be defined and recognized.

The classes may be tested according to priority. The first class that is detected may be the one selected. Alternatively, each detected class may be assigned a class weight, a priority weight, and/or a detection score to aid in selecting a target object to use as the basis for the visually augmented navigation instructions, it could be a weight of class priority and detection score.

In some embodiments, a decision tree can be used. If a match is found, then visually augmented navigation instructions may be provided. On the other hand, if no match is found then a standard GPS type instruction may be provided: e.g., "turn left in 200 m."

A particular target object need not be used as the basis for an entire set of navigational instructions relative to a particular point on a route. Instead, navigation system may intermittently or continuously seek additional or alternative target objects and provide updated instructions if a new target object is detected (especially one with a higher hierarchical status than a previously relied upon target object). For example, in the case of a landmark first detected opposite to a turn and then later, a second landmark is detected on the same side as the turn, an updated instruction may be provided based on the newly detected landmark. Additionally, if landmarks exist in the map database but were not visually verified, the system may repeatedly attempt to visually verify the landmark. Once visually verified, the instructions may be updated.

Once the visually augmented navigational instructions have been determined, they may be delivered to a user of navigation system 100. In some embodiments, the instructions may be delivered audibly (e.g., via one or more speakers associated with vehicle 200, via speaker 430 of mobile device 400, or via earplug/speaker 530 associated with wearable device 500). Additionally or alternatively, the instructions may be delivered visually (e.g., via display/touchscreen 320 of vehicle 200, via display/touchscreen 410 of mobile device 400, or via display 510 of wearable device 500).

While illustrative embodiments have been described herein, the described examples are non-exclusive. Furthermore, the steps of the disclosed routines may be modified in any manner, including by reordering steps and/or inserting or deleting steps. It is intended that the specification and examples be considered as illustrative only, with a true scope and spirit being indicated by the following claims and their full scope of equivalents.

What is claimed is:

1. A navigation system, comprising:
   at least one processing device configured to:
   determine, based on an output of one or more position sensors associated with the navigation system, a current location of at least one component associated with the navigation system;
   determine a destination location different from the current location;
   acquire, from one or more image acquisition devices, while a user of the navigation system is located in an environment and navigating from the current location to the destination location, a plurality of images representative of the environment;
   analyze, while the user is navigating from the current location to the destination location, the plurality of images to derive a physical characteristic of at least one object appearing within a field of view of at least one of the image acquisition devices;
   determine, based on an appearance of the physical characteristic of the at least one object derived from the plurality of images while the user is navigating, one or more instructions for navigating from the current location to the destination location, wherein the one or more instructions include a description of the physical characteristic of the at least one object derived from the plurality of images; and
   deliver to the user the one or more instructions.

2. The navigation system of claim 1, wherein determination of the destination location is based on user input.

3. The navigation system of claim 2, wherein the user input includes entry of an address corresponding to the destination location.

4. The navigation system of claim 1, wherein the one or more image acquisition devices include a first camera and a second camera, the first camera having a focal length different from a focal length of the second camera.

5. The navigation system of claim 4, wherein the one or more image acquisition devices include a third camera having a focal length different from the focal length of the first camera and the focal length of the second camera.

6. The navigation system of claim 1, wherein the one or more image acquisition devices include a camera having a resolution of at least 5 megapixels.

7. The navigation system of claim 1, wherein the at least one object includes at least one of a vehicle, a building, a sign, a traffic light, a road feature, a structure, or a person.

8. The navigation system of claim 1, wherein the at least one processing device is configured to:
   use map data to identify at least one mapped entity;
   determine, based on the plurality of images, whether the at least one mapped entity is visible to the user; and
   include in the one or more instructions at least one reference to the mapped entity, if the mapped entity is determined to be visible to the user.

9. The navigation system of claim 1, wherein the at least one processing device is configured to:
   use map data to identify at least one mapped entity;
   determine, based on the plurality of images, whether the at least one mapped entity is visible to the user; and
   include in the determined one or more instructions at least one reference to the mapped entity and at least one reference to an object obscuring the mapped entity from the user's view, if the mapped entity is determined not to be visible to the user.

10. The navigation system of claim 1, wherein the at least one processing device is configured to:
    use map data to identify at least one mapped entity;
    determine, based on the plurality of images, whether the at least one mapped entity is visible to the user; and
    omit from the determined one or more instructions any references to the mapped entity, if the mapped entity is determined not to be visible to the user.

11. The navigation system of claim 1, wherein the physical characteristic includes a color associated with the at least one object in the environment.

12. The navigation system of claim 1, wherein the physical characteristic includes an object type associated with the at least one object in the environment.

13. The navigation system of claim 1, wherein the one or more instructions are delivered audibly to the user.

14. The navigation system of claim 1, wherein the one or more instructions are delivered to at least one of a display or a speaker associated with a mobile device.

15. The navigation system of claim 1, wherein the one or more instructions are delivered to at least one of a display or a speaker associated with a vehicle.

16. The navigation system of claim 1, wherein the one or more instructions are delivered to at least one of a display or a speaker associated with a wearable device.

17. The navigation system of claim 1, wherein the one or more image acquisition devices include a camera from an Advanced Driver Assistance System.

18. A vehicle, comprising:
    a GPS sensor configured to provide an output representative of a position of the vehicle;
    one or more image acquisition devices configured to acquire a plurality of images of an environment outside of the vehicle;
    at least one processing device configured to:
    determine, based on an output of one or more position sensors associated with the vehicle, a current location of at least one component associated with the vehicle;
    determine a destination location different from the current location;
    acquire, from one or more image acquisition devices, while a user of the vehicle is located in an environment and navigating from the current location to the destination location, a plurality of images representative of the environment;
    analyze, while the user is navigating from the current location to the destination location, the plurality of images to derive a physical characteristic of at least one object appearing within a field of view of at least one of the image acquisition devices;
    determine, based on an appearance of the physical characteristic of the at least one object derived from the plurality of images while the user is navigating, one or more instructions for navigating from the current location to the destination location, wherein the one or more instructions include a description of the physical characteristic of the at least one object derived from the plurality of images; and
deliver to the user the one or more instructions.

19. The vehicle of claim 18, wherein determination of the destination location is based on user input including an address corresponding to the destination location.

20. The vehicle of claim 18, wherein the one or more image acquisition devices include a first camera and a second camera, the first camera having a focal length different from a focal length of the second camera.

21. The vehicle of claim 18, wherein the one or more image acquisition devices include a camera having a resolution of at least 5 megapixels.

22. The vehicle of claim 18, wherein the at least one object includes at least one of a vehicle, a building, a sign, a traffic light, a road feature, a structure, or a person.

23. The vehicle of claim 18, wherein the at least one processing device is configured to:
use map data to identify at least one mapped entity;
determine, based on the plurality of images, whether the at least one mapped entity is visible to the user; and
include in the determined one or more instructions at least one reference to the mapped entity, if the mapped entity is determined to be visible to the user.

24. The vehicle of claim 23, wherein the at least one processing device is configured to:
include in the determined one or more instructions at least one reference to the mapped entity and at least one reference to an object obscuring the mapped entity from the user's view, when the mapped entity is determined not to be visible to the user.

25. The vehicle of claim 18, wherein the physical characteristic includes at least one of a color or a type associated with the at least one object in the environment.

26. The vehicle of claim 18, wherein the one or more instructions are delivered audibly to the user.

27. A method for generating and delivering navigational information, the method comprising:
using one or more processing devices to determine a current location based on an output of one or more position sensors;
determining a destination location different from the current location;
acquiring, from one or more image acquisition devices, while an individual is located in an environment and navigating from the current location to the destination location, a plurality of images representative of the environment;
using the one or more processing devices to analyze, while the user is navigating from the current location to the destination location, the plurality of images to derive a physical characteristic of at least one object appearing within a field of view of at least one of the image acquisition devices;
determining, based on an appearance of the physical characteristic of the at least one object derived from the plurality of images while the user is navigating, one or more instructions for navigating from the current location to the destination location, wherein the one or more instructions include physical characteristic of the at least one object derived from the plurality of images; and
delivering to the individual the one or more instructions.

28. The navigation system of claim 1, wherein the at least one object includes a target vehicle, and the at least one processing device is further configured to:
analyze the plurality of images to derive the physical characteristic associated with a target vehicle located in the environment at a distance of interest from the current location,
wherein the one or more instructions include a reference to the description of the derived physical characteristic associated with the target vehicle.

29. A navigation system comprising:
at least one processing device configured to:
acquire, from one or more image acquisition devices, while a vehicle is located in an environment and navigating from a current location to a destination location, a plurality of images representative of the environment;
analyze, while the vehicle is navigating from the current location to the destination location, the plurality of images to derive a physical characteristic associated with at least one object appearing in a field of view of at least one of the image acquisition devices; and
determine one or more instructions for navigating the vehicle from the current location to the destination location, wherein the one or more instructions include at least one reference to a description of the physical characteristic of the at least one object derived from the plurality of images.

30. The navigation system of claim 29, wherein the at least one object appearing in the field of view of the at least one of the image acquisition devices is at least partially visually obstructing a landmark.

31. The navigation system of claim 29, wherein the at least one object appearing in the field of view of the at least one of the image acquisition devices is another vehicle, and the one or more instructions include at least one reference to the description of the physical characteristic derived from the another vehicle.

32. The navigation system of claim 29, wherein the at least one object appearing in the field of view of the at least one of the image acquisition devices is a pedestrian.

33. The navigation system of claim 29, wherein at least one of the image acquisition devices is mounted behind a windshield of the vehicle.

34. The navigation system of claim 33, wherein the image acquisition devices are part of or are associated with an Advanced Driver Assistance System ("ADAS") or an Autonomous Vehicle ("AV") system.

35. The navigation system of claim 1, wherein the physical characteristic of the at least one object is a color of an awning.

36. The navigation system of claim 1, wherein the at least one object is a mapped entity.

37. The navigation system of claim 36, wherein the mapped entity is a landmark.

38. The system of claim 1, wherein the at least one object includes a plurality of mapped entities, and the plurality of mapped entities are prioritized to determine which of the plurality of mapped entities to use for deriving the physical characteristic.

39. The navigation system of claim 38, wherein the plurality of mapped entities are prioritized based on their locations relative to an intersection or a turn direction.

40. The navigation system of claim 38, wherein the plurality of mapped entities are prioritized based on their visibility and locations.

41. The navigation system of claim 1, wherein the one or more instructions are further determined based on motion characteristics of the at least one object derived from the plurality of images.

42. The navigation system of claim 1, wherein the one or more instructions are further determined based on a visibility condition of the at least one object.

* * * * *